Patented Apr. 10, 1923. 1,451,481

UNITED STATES PATENT OFFICE.

ELBERT S. VINCENT, OF SALEM, OHIO, ASSIGNOR TO THE DEMING COMPANY, OF SALEM, OHIO, A CORPORATION OF OHIO.

PRESSURE REGULATOR.

Application filed November 29, 1920. Serial No. 426,992.

*To all whom it may concern:*

Be it known that I, ELBERT S. VINCENT, a citizen of the United States, residing at Salem, in the county of Columbiana and State of Ohio, have invented a certain new and useful Improvement in Pressure Regulators, of which the following is a full, clear, and exact description, reference being had to the accompanying drawings.

This invention relates to improvements in pressure relief valves adapted particularly for use on spraying machines.

The apparatus used for spraying usually comprises a pump, a supply tank and a fluid conduit from which a number of branch lines lead to several spray nozzles. Pressure relief valves have heretofore been used in connection with such apparatus, to prevent excessive pressure in the supply lines, and additional means have been provided for circulating excess fluid back into the supply tank to minimize the load on the pump when some or all of the operating nozzles are closed.

One of the objects of this invention is the provision of a valve which is adapted to operate in accordance with the plan outlines above, and which has novel features of construction for permitting the valve to be disassembled and the parts cleaned without breaking any of the pipe joints.

Other objects include the provision of a relief valve that is simple in construction, whereby the parts thereof may be easily machined, and that is adapted to be quickly assembled and cheaply manufactured.

The above and other features will be fully set forth in the following description which relates to the drawings, and the essential characteristics will be set forth in the claims.

Figure 1:
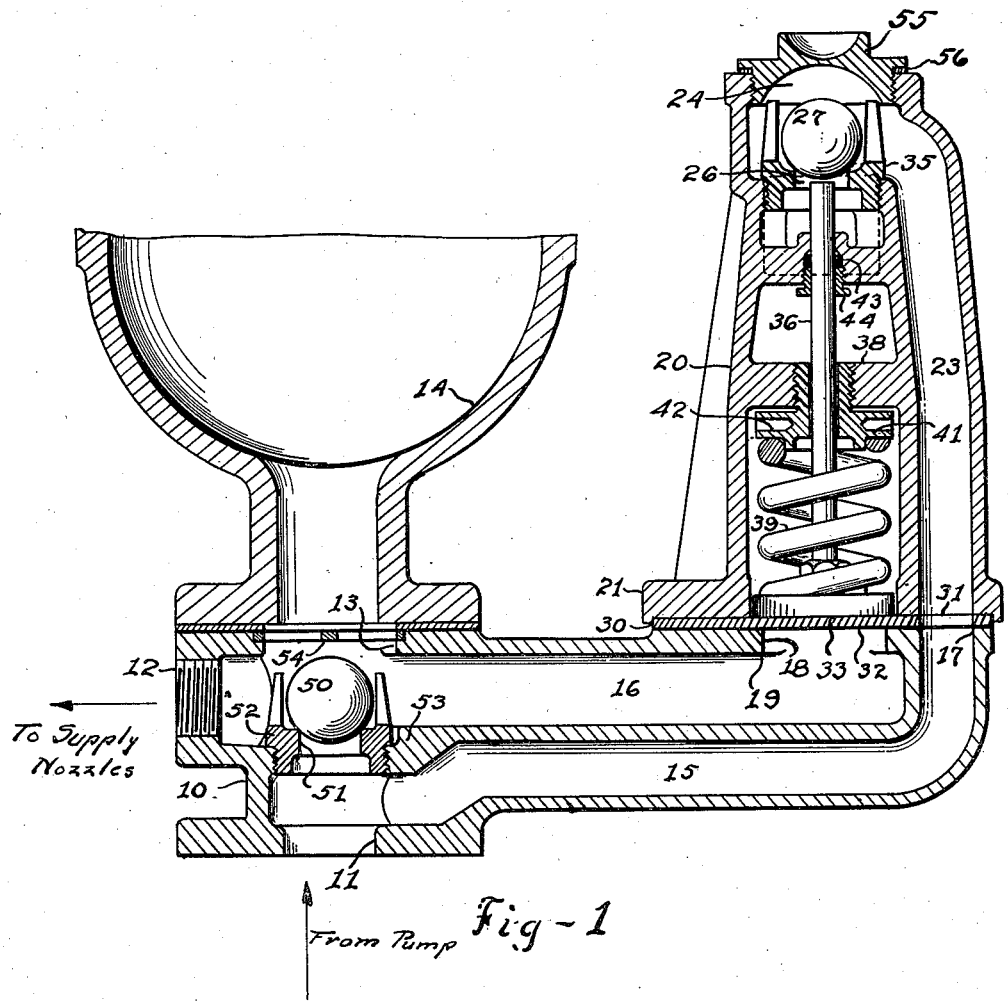
Figure 2:
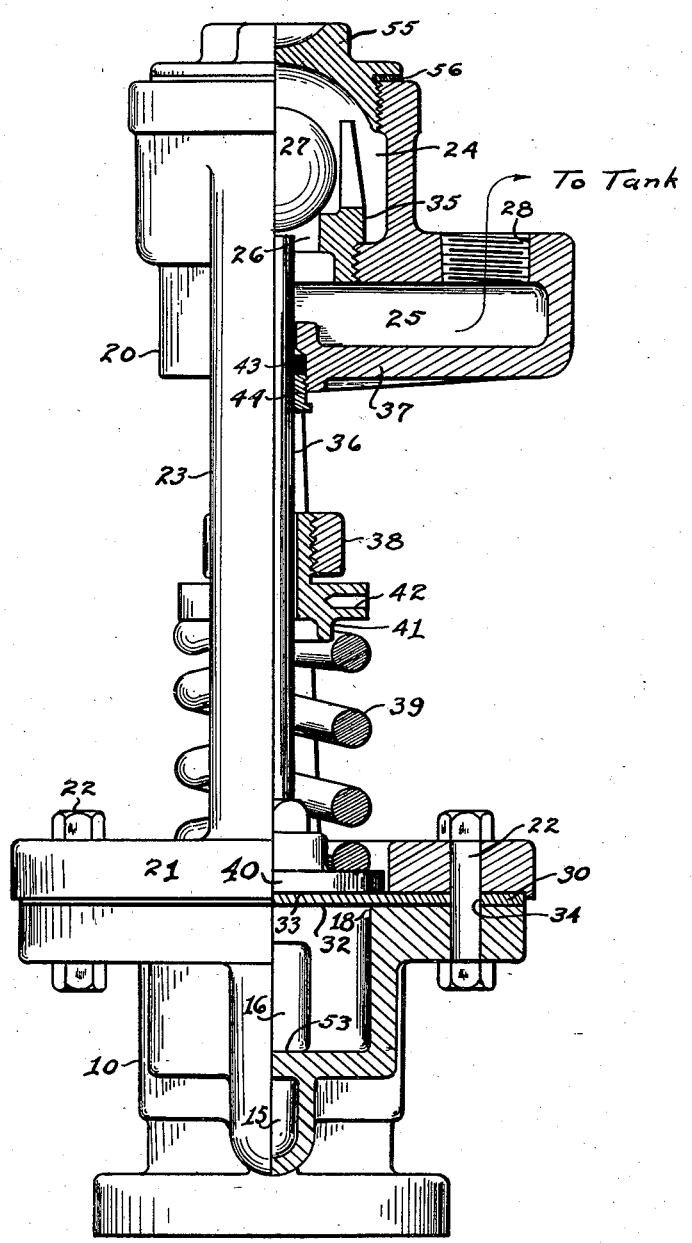

In the drawings Fig. 1 is a section partly in elevation of a valve embodying the features of my invention; Fig. 2 is an end elevation partly in section showing the connection between the tank conduit and the valve proper.

Designating the parts by the use of reference characters, 10 represents in general a lower casing having an aperture 11, adapted to be connected to a supply pump, an aperture 12, leading to a conduit from which a number of supply or operating nozzles may extend, and an aperture 13 leading into an air chamber 14. This casing 10 preferably comprises a casting, having a lower conduit 15 leading from the pump aperture 11, and an upper conduit 16 leading from the supply aperture 12. The conduits 15 and 16 extend upwardly and lead outwardly from the casing 10 at the aperture 17 and 18 respectively.

An upper casing 20 carrying the pressure relief valve is supported on the lower casing 10 preferably at a point remote from the pump inlet 11. The casing 20 may be provided with a flange 21 and be secured to the lower casing by any suitable means, such as bolts 22. A circuitous passage 23 extends along one side of the casing 20 and is adapted to register with the aperture 17 in the lower casing. The passage 23 leads upwardly and enters a chamber 24 in the upper portion of the casing. Located beneath the chamber 24 there is another chamber 25 communicating therewith, through the passageway 26, which passageway is normally closed by the ball valve 27. An outlet aperture 28 leads from the chamber 25, and is adapted to receive either a flexible or rigid tube which leads to a supply tank.

Separating the casing 10 from the casing 20 is a diaphragm 30, which extends across the lower face of the flange 21, and serves as a gasket between the upper and lower casings. This diaphragm is provided with an aperture 31, which registers with the aperture 17 and permits fluid to pass from the tube 15 into the passageway 23. The lower surface 32 at the center of the diaphragm is subjected to contact with the fluid within the tube 16; while the upper surface 33 is subjected to the action of a spring-pressed plate, which will be hereinafter described. The diaphragm 30 may be provided with a series of apertures 34, through which the bolts 22 are passed, so that the same bolts which secure the casings together also serve to retain the diaphragm in position.

The valve and the operating means therefor, in the upper casing 20, comprise a ball valve 27, normally held against the seat 35, but adapted to be moved upwardly therefrom by the rod 36. This rod extends through the lower wall 37, of the chamber 25, and through a guiding web or spider 38, at the middle portion of the casing 20; and into the passageway 26 without touching the ball 27. The lower portion of the upper casing may be open to receive the spring 39, one end of which abuts a plate 40, and the other end of which abuts the lower face of an adjusting screw 41. This adjusting screw may be provided with sockets 42, into which a tool may be inserted to turn the nut, and adjust the tension on the spring 39. This adjusting nut may be threaded into the web 38 so that when the nut is turned the forces are transmitted directly to the casing.

The spring pressed plate 40 is preferably circular in form and has a diameter which is larger than the diameter of the aperture 18 in the lower casing 10. When the pressure in the chamber 16 drops below a certain predetermined amount, then the periphery of the plate rests upon the overhanging shoulder 19 and transmits the force exerted by the spring directly to the lower casing. Consequently there is no shearing strain placed upon the diaphragm when the apparatus is not in operation.

Suitable packing 43 is provided near the upper portion of the rod 36 and held thereagainst by a packing gland 44 to prevent any fluid from escaping from the chamber 25. Directly above the ball 27, I may also provide a removable cap 55, which is separated from the casting 20 by the gasket 56, and which has ample size to permit the removal of the ball valve 27 and the seat 35.

The lower casing 10 is provided with a check valve, which comprises the ball valve 50 normally held against the seat 51. I have found that more satisfactory operation is obtained if the valve 50 and seat or port 51 are larger than the valve 27 and passageway 26. The difference in size prevents chattering of the valves and seems to provide more effective operation than is obtained when both valves are the same in size. This seat 51 is normally held by being threaded in the wall 53, intermediate passageways 15 and 16. When the pump is in operation the pressure of the fluid will force the ball 50 upwardly, and a spider, or web 54, may extend across the aperture 13 directly above the wall 53 and limit the vertical movement of the ball, without interfering with the flow of liquid into the supply lines.

The operation of my invention is as follows:—Assuming that the aperture 11 is connected with a pump conduit and the outlets 12 and 28 are connected with a supply line and a tank line, respectively, then, as the pump is operated the fluid flows upwardly into the passageway 16 and presses against the lower face of the diaphragm 30. Fluid also passes through the tube 15 upwardly through the passageway 23 and presses downwardly on the ball valve 27. The top of the rod 36 is so positioned that it does not touch the ball, when the nozzles are connected for normal operation; consequently, when one or more of the operating nozzles are closed, the pressure in the passageway 16 is increased and the diaphragm is forced upwardly.

When the diaphragm moves upwardly the rod 36 is moved against the tension of the spring 39, whereupon the ball 27 is raised from the seat 35. The fluid in the passage 23, and the chamber 24, is then forced into the chamber 25, and thence back into the supply tank. As soon as the ball 27 is lifted from its seat, the pressure in the passageway 15 is reduced below that in the passage 16, whereupon the ball 50 is urged against the seat 51; consequently, the load on the pump is immediately reduced, and the pump is only required to circulate the fluid from the tank, through the ball valve 27, and thence back into the tank.

As soon as the pressure in the passageway 16 is reduced,—and this is occasioned by use of fluid through one or more operating nozzles,—then the diaphragm 30 is urged downwardly by the spring 39, and the ball 27 is again seated, while the exit passage 26 to the tank is closed. Since the pump operates continuously, then the pressure again builds up in the tube 15 and raises the ball 50 to supply fluid to the operating nozzles. The tension of the spring 39 may be so regulated by the adjusting nut 41, that the ball 27 is quickly raised as soon as one of the operating nozzles is closed.

Having thus described my invention, I claim:

1. In a device of the character described, the combination with a lower casing having a laterally extending partition therein, passageways on opposite sides of the partition, a valve disposed in the partition between said passageways, one of said passageways being arranged to communicate with a supply conduit and the other with a pump conduit, each of said passageways terminating adjacent one end of the casing, a pressure relief valve carried by the casing adjacent the termini of said passageways, and an air chamber carried by the casing and communicating with the passageway leading to the supply conduit.

2. In a device of the character described, the combination with a lower casing arranged to receive a pump conduit, and a supply conduit, said casing having an aperture leading into an air chamber, a valve intermediate the pump conduit and the air chamber, said chamber, valve and pump conduit being in vertical alignment, an upper casing, a diaphragm intermediate the upper and lower casings, a pressure relief valve in the upper casing, and means actuated by the diaphragm for releasing said last mentioned valve.

In testimony whereof, I hereunto affix my signature.

ELBERT S. VINCENT.

Witnesses:
WM. THOMAS,
JOHN T. H. MCNICOL.